United States Patent
Bayer et al.

(10) Patent No.: US 12,243,336 B2
(45) Date of Patent: Mar. 4, 2025

(54) AUTHENTICATION OF AGE, GENDER, AND OTHER BIOMETRIC DATA FROM LIVE IMAGES OF USERS

(71) Applicant: Jumio Corporation, Palo Alto, CA (US)

(72) Inventors: Lukas Bayer, Vienna (AT); Can Wang, Toronto (CA); Dayron Rizo Rodriguez, Land O Lakes, FL (US); Jason Richard Taylor, Montreal (CA)

(73) Assignee: Jumio Corporation, Sunnyvale, CA (US)

( * ) Notice: Subject to any disclaimer, the term of this patent is extended or adjusted under 35 U.S.C. 154(b) by 297 days.

(21) Appl. No.: 17/708,132

(22) Filed: Mar. 30, 2022

(65) Prior Publication Data

US 2023/0316790 A1 Oct. 5, 2023

(51) Int. Cl.
*G06V 20/00* (2022.01)
*G06V 10/56* (2022.01)
*G06V 10/75* (2022.01)
*G06V 40/16* (2022.01)

(52) U.S. Cl.
CPC .............. *G06V 20/95* (2022.01); *G06V 10/56* (2022.01); *G06V 10/751* (2022.01); *G06V 40/168* (2022.01); *G06V 40/172* (2022.01); *G06V 40/178* (2022.01); *G06V 40/179* (2022.01)

(58) Field of Classification Search
None
See application file for complete search history.

(56) References Cited

U.S. PATENT DOCUMENTS

| | | | |
|---|---|---|---|
| 2011/0206198 A1* | 8/2011 | Freedman | H04M 3/42221 379/265.03 |
| 2017/0351909 A1* | 12/2017 | Kaehler | G06V 40/171 |

OTHER PUBLICATIONS

PCT International Search Report and Written Opinion; Application No. PCTUS2023064925 Jumio Corporation, International filing date of Mar. 24, 2023, date of mailing Aug. 11, 2023, 11 pages.

* cited by examiner

*Primary Examiner* — Andrew H Lam
(74) *Attorney, Agent, or Firm* — Patent Law Works LLP (57) ABSTRACT

A system and method is disclosed for improving fraud detection in the context of a user submitting, via a client device, a photo of a photo ID and a selfie taken during a step of the verification process. A machine learning model may be trained to generate biometric data signals from the selfie. As examples, the biometric data signals generated from the selfie can include an estimated age, gender, hair color, and eye color. The biometric data generated from the selfie may be compared with biometric data listed on the photo ID as an aid to identifying potential identity fraud. In some implementations, a facial filter corresponding to a map of a set of facial measurements of the photo in the photo ID may be compared with the facial measurements of the selfie.

10 Claims, 9 Drawing Sheets

Figure 1A

Biometric Data Stated on Photo ID (e.g., date of birth, sex, height, weight, hair color, eye color, issue date, etc.) 152

AI/ML Biometric Data from Photo Analysis of Photo ID (e.g., estimated age, gender, facial feature map, hair color, eye color, etc.) 154

AI/ML Biometric Data from Live Photo/Video Frame(s) (e.g., estimated age, gender facial feature map, hair color, eye color, etc.) 156

AI/ML Biometric Data from Non-Live Photo/Video Frame(s) (e.g., estimated age, gender facial feature map, hair color, eye color, etc.) 157

AI/ML Photo Matching Data 158

Other Data (e.g., historical photo/selfie/biometric data) 160

Figure 8

AUTHENTICATION OF AGE, GENDER, AND OTHER BIOMETRIC DATA FROM LIVE IMAGES OF USERS

BACKGROUND

The present disclosure relates to verification of identify. More specifically, the present disclosure relates to identity confirmation or verification.

Entities, such as governments, businesses, and individuals, may seek to confirm an identity of a person for any number of reasons. To confirm an identity, a comparison is often made between an attribute (e.g., face) of the person present and reference documentation (e.g., a photo identification document commonly known as a "a photo ID" showing the person's face).

There are variety of types of identity fraud. As an example, some fraudsters use fake photo IDs to commit various types of fraud. While government issued photo IDs typically have a variety of security features, fraudsters are continually working to evade security features such as seals on photos and other security features intended to make it difficult for fraudsters to use counterfeit photo IDs.

As another example, adolescents sometimes attempt to use the valid photo IDs of their parents or of an older sibling having a similar looking face.

Embodiments of the invention were developed in view of the above-described problems.

SUMMARY

A computer implemented system generates biometric data from photos. The biometric data generated from photos can include, for example, biometric data generated from the photo of a photos ID, from photo(s)/video(s) taken during a user identity authentication process, or from photo(s)/videos from our sources, such as from an historical database of previous user authentication tests.

An exemplary method includes receiving a photo of a photo identification document of a human being to be authenticated. At least one other photo or video frame of the human being is received. This may include at least one live photo or video frame of the human being, although in some implementations there may not be a live photo or video frame. For example be from an historical database of previous received photos or video clips. The example method includes identifying biometric data listed in the photo identification document. Biometric data is generated from the at least one other photo or video frame based on an analysis utilizing a machine learning model trained to identify biometric data from photos. A fraud signal is generated based on a comparison of the biometric data listed in the photo identification document and the generated biometric data.

Other implementations of one or more of these aspects include corresponding systems, apparatus, and computer programs, configured to perform the actions of the methods, encoded on computer storage devices.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The present disclosure is described in the context of analyzing photos and generating indicator signals for biometric user identification and fraud detection, such as indicator signals for age or other biometric data such as hair color, eye color, and gender. In some implementations, a facial filter (e.g., a facial feature map representing key distances between the eyes, nose, mouth, etc.) may be used as an additional type of biometric information to generate indicator signals in a fraud detector. In some implementations, composite fraud signals may be generated from two or more indicator signals.

The indicator signals may be used in identity establishment process performed for a variety of purposes, such as for purchasing goods or services through an online merchant, applying for government services live or online, purchasing alcohol live or online, etc.

Example Architecture and Fraud Detector

Figure 1A:
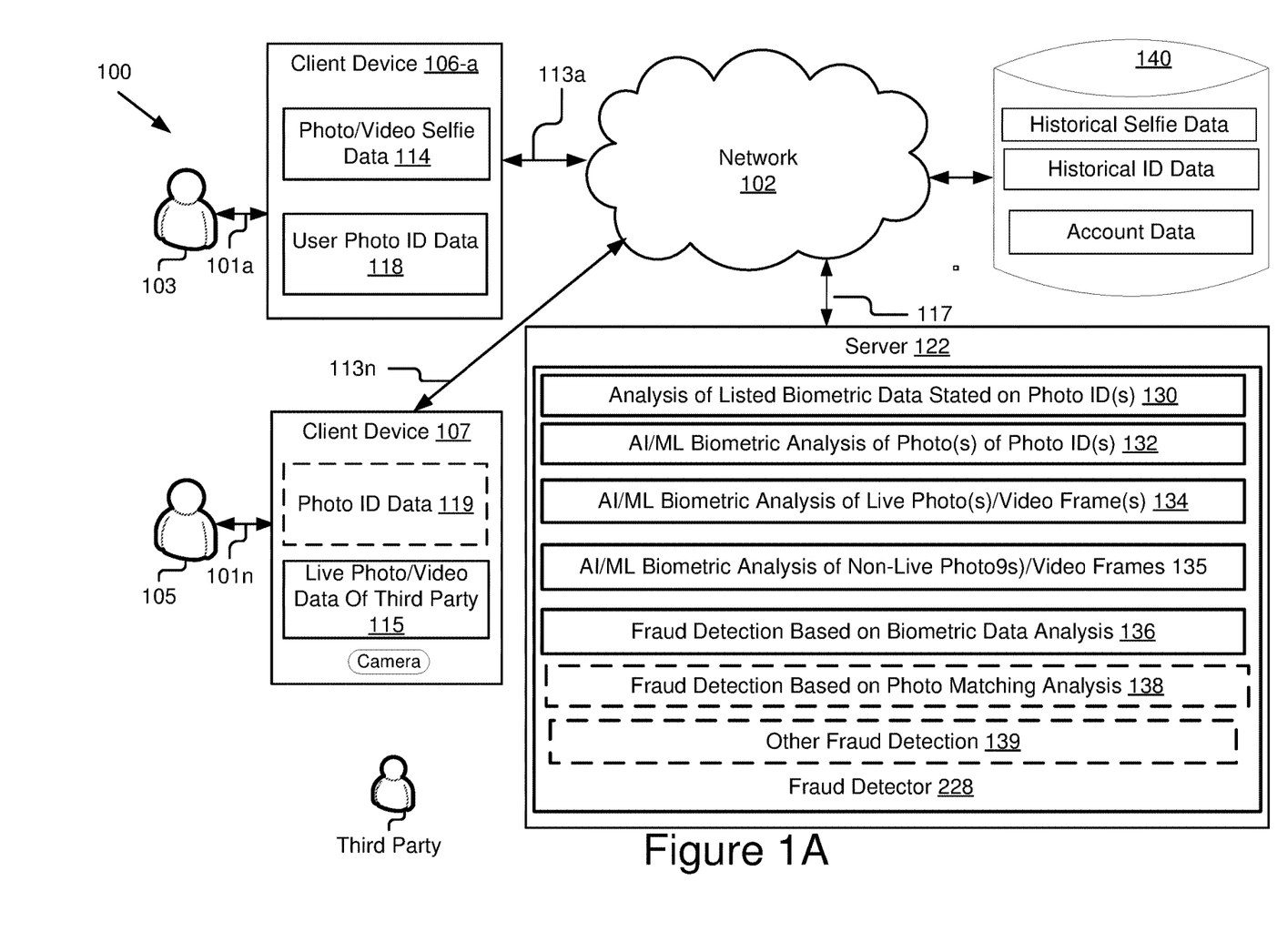
FIG. 1A is a block diagram of one example implementation of a system for detecting identify fraud in accordance with some implementations.

FIG. 1A illustrates a general client-server environment 100 to illustrate aspects of generating biometric indicator signals from photos for use in various types of fraud detection. A client device 106 may include a camera, a display, a processor, a memory, and a network interface, such as a wired or wireless Internet connection. Examples of client devices 106 may include, but are not limited to, mobile phones (e.g., feature phones, smart phones, etc.), tablets, laptops, desktops, netbooks, portable media players, personal digital assistants, etc.

An identity identification process may be initiated to authenticate a user 103 of client device 106 to identify themselves. In one implementation, a user 103 may interact 101*a* with their client device 106 and perform actions such as taking a photo (or photos) of their photo identification document (commonly known as a "photo ID") to form user photo ID data 118. For example, the user may take a photo or photos of their driver's license, passport, photo identification card, or photo identification document to form user photo ID data 118.

A user 103 may also snap a photo, a set of photos, or a short video of themselves from which key frames can be extracted. This data may also be captured live in a manner selected to verify the physical presence of user 103 during an authentical process. In some implementations, the user 103 may also be instructed to provide photos from different angles (e.g., front view, side views, looking up, looking down, etc.). Capturing photos/video frames from different angles is useful for some types of image analysis.

An individual client device 106a may interact with a network 102 via communication link 113a that may, for example, be implemented using wired or wireless communication. The user photo ID data 118 and photo/video selfie data 114 may be communicated to an entity responsible for fraud detection, such as a fraud detector 228 on server 122.

In an alternate implementation, a client device 107 may be used by a user 105 to interact 101n with a client device 107, take a photo, a set of photos, or a short video (from which key frames may be extracted) of a third party to generate live photo/video data 115 of a third party. The user 105 may also optionally take one or more photos of the photo ID of the third party. The client device 107 may interact with the network 102 via communication link 113n that may, for example, be implemented using wired or wireless communication. The client device 107 may provide the live photo/video data of the third party 115 to fraud detector 228. If photo ID data 119 is available or the third party, the client device 107 may also provide that information.

In one implementation, to confirm an identity of a user 103 of a client device 106 during an identity establishment process, a comparison is made between at least one photo of a photo ID 118 of the user 103 (e.g., a driver's license, passport, state identification card, other type of photo identification card (e.g., military ID), or other type of photo identification) and at least one photo or key frames of a video 114 of the person taken during a verification step. For example, a user wishing to establish his/her identity with an entity, e.g., a government agency or a commercial enterprise, the user may be asked to 1) submit at least one photo of their photo ID and 2) also submit selfie photos or a video clip taken live during a step in the identity establishment process. For example, the identity establishment process may occur through an entity's application on a mobile phone or through the entity's portal on a web browser.

An identity of a third party may also be confirmed using similar information. However, there are also applications, such as identifying adolescents, that in some alternate implementations may use only the live photo/video data of the third party 115 to estimate age. For example, a nightclub may want a technique to automatically identify under-age adolescents. Conversely, a high school may want a technique to automatically identify adult visitors who are not of student age.

An individual user photo ID may have associated with it an ID photo, an ID seal, security features, an issuing entity (e.g., a state for a state driver's license or a country for national ID card or passport, such as a French ID), a name, an address, an ID number, etc. The photo of a photo ID may be analyzed for signs of fraud, such as altering the photo or other portions of the ID.

A photo ID typically includes a date of birth from which an age can be determined. A photo ID also typically includes a date of issuance and a conventional binary male/female gender identification (i.e., M/F). (However, increasingly some jurisdictions permit gender-neutral non-binary ID cards such as those with an "X"). A photo ID may also include eye color, and hair color. Many (but not all) photo IDs include height and weight.

Photo/video selfie data 114 may include one or more photos and/or a video clip (or key frames extracted from a video clip) taken during a verification step. The selfie data 114 may be taken as live data, i.e., with the person in the selfie data present at a particular time during an identity establishment process. Photo analysis may be used to aid in verifying that the selfie is not a photo of a photo or otherwise a false image. Similarly, the live photo/video data of a third party 115 may be taken with one or more steps taken to ensure it taken as live data.

A fraud detector 228 has a fraud model that detects instances of potential identity fraud. In some implementations, the fraud detector 228 includes a photo matching analysis module 138 to compare the photo of a photo ID with live photo/video images. A variety of other fraud detection techniques 139 may also optionally be supported by the fraud detector.

The fraud detector 228 may be implemented on a server 122, although more generally it could be implemented in other parts of the system 100 as well, as a cloud-based or cloud-assisted service, etc. However for the purposes of illustration, a server-based service is shown. The server may be coupled to network 102 via a communications interface 117. The server 122 may in some implementations have access to a database 140 of historical ID data, historical selfie data, and account data.

The fraud detector 228 may include a convolutional neural network trained to perform facial image recognition and analyze signs of potential fraudulent altering of a photo. The fraud detector may also include a convolutional neural network trained to analyze features in photos and generate predictions (probabilities) for biometric data, such as an age associated with the person in a picture, a gender (M/F), a hair color, an eye color, etc. That, is the predictions have an associated probability or confidence level. In some implementations, a multi-class model may be used.

The fraud detector 228 may be implemented using a variety of machine learning techniques, including supervised learning, unsupervised learning, semi-supervised learning, etc. Additionally, the fraud detector 228 may include more than one type of machine learning model for different types of biometric identification data.

A photo ID includes biometric data printed on the photo ID such as age, sex, hair color, eye color, and height/weight. This information can be extracted by using, for example, optical character recognition (OCR). In some cases a photo ID may include biometric data encoded as an optical bar code or other machine readable optical code. In some implementations, the optical code is read to identify the biometric data listed in the photo ID.

In one implementation, a module 130 is included to analyze the listed biometric data on a photo ID, such as by performing optical character recognition or reading optical bar codes to identify the enumerated biometric data, which may include, for example, age, sex, hair color, and eye color.

An image analysis module 132 may use an AI/ML model to perform biometric analysis of photo(s) of photo IDs. For example, a photo on a driver's license or passport may be analyzed using a machine learning model to predict an age of the person in the photo, a gender (e.g., M/F), an eye color, and a hair color. In some implementations, a facial feature filter mask may be also be implemented that identifies, for example, a map of facial features such as relative distances between a set of facial features such as distances of the eyes, nose, mouth, etc. The facial feature filter metrics may be considered to be an additional type of biometric data indicative of the general shape of a face.

In one implementation, an image module 134 may use an AI/ML model to perform biometric analysis of live photos/video frames from photo/video selfie data 114 or live photo/video data of a third party 115. This may include identifying a likely age of the person in a photo, a likely gender (e.g., M/F), a likely eye color, and a likely hair color. A facial feature filter may also be implemented that identifies, for example, a map of facial features such as relative distances between a set of different facial features.

In some implementations, an image module 135 may also perform biometric analysis of non-live photo(s)/video(s) on file or otherwise available. For example, biometric analysis may be performed based on historic selfie data for the same user. There may (in some cases) be photos or video clips previously received of a user during a previous authentication process (e.g., one week ago, one month ago, one year ago, etc.) As another example, biometric analysis may be optionally performed on other photo(s)/video(s) submitted by a user or available from other sources.

Photo/video selfie data 114 data taken from a client device may also capture a set of facial images from different angles (e.g., front, right side, left side, neck up, neck down) providing additional information about the three-dimensional shape of a face. For example, a user may be instructed to take a series of photos from different angles.

In an alternate implementation, estimates of height and weight may also be generated. For a set of live photos or a video, an estimate of a user's height may be obtained by, for example, taking one or more photos with other reference features in the photo (e.g., a user standing next to an object of a known size or holding an object of a known size). Thus, in some alternative implementations, biometric data on a user's height may be determined from photos. If full body images (e.g., front, side, and back) are also available, estimates of weight may also be optionally generated.

The fraud detector 228 may include a module for fraud detection based on a photo matching analysis 138 that attempts to find a match between the photo in a photo ID and a live photo/video. The overall system may also include a module 139 to support other forms of fraud detection 139.

Photo matching analysis is useful to identify fraud, but has some drawbacks. It's useful to have additional indicator signals to improve the overall confidence level and minimize false positive and false negative determinations of fraud. Fraudsters may attempt to use counterfeit photo IDs that replace the original photo with the fraudster's photo. There are also instances in which adolescents attempt to use the photo ID of a similar looking family member, such as a sibling, cousin, aunt, uncle or a parent who bears a close facial similarity.

A fraud detection module 136 may generate indicator signals for fraud detection based on biometric data analysis. The indicator signals may take different forms. The simplest form is T/F signals. For example, an indicator signal may be a T/F signal that there is an age match between biometric data listed on a photo ID and an age estimate generated from a live photo or video. (Indicator signals may also be generated for non-live photo(s)/video(s). However, as will be discussed later, the indicator signals may be implemented in other ways, such as outputting an estimated age (although in some implementations the estimate age is output with additional information regarding the accuracy of the estimated age).

The overall system may include a database 140 that stores selfie data, photo ID data, account data, liveness data, repeated fraudster data, etc. That is, while there are individual instances in which an identity establishment process is performed, an overall system may handle a large number of identity establishment checks and store data to aid in performing repeated fraudster detection and for improving the models used in the system. For example, the overall system may use historical data to improve its facial recognition capabilities and its abilities to determine biometric data from photos.

For purpose of illustration, FIG. 1A is illustrated with a limited number of client devices. However, it should be understood that there may be any number of client devices 106 and 107. It should be understood that the system 100 depicted in FIG. 1A is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wireless local area networks (WLAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit. The server 122 may be communicatively coupled to the network 102, as indicated by signal line 117. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

Figure 1B:
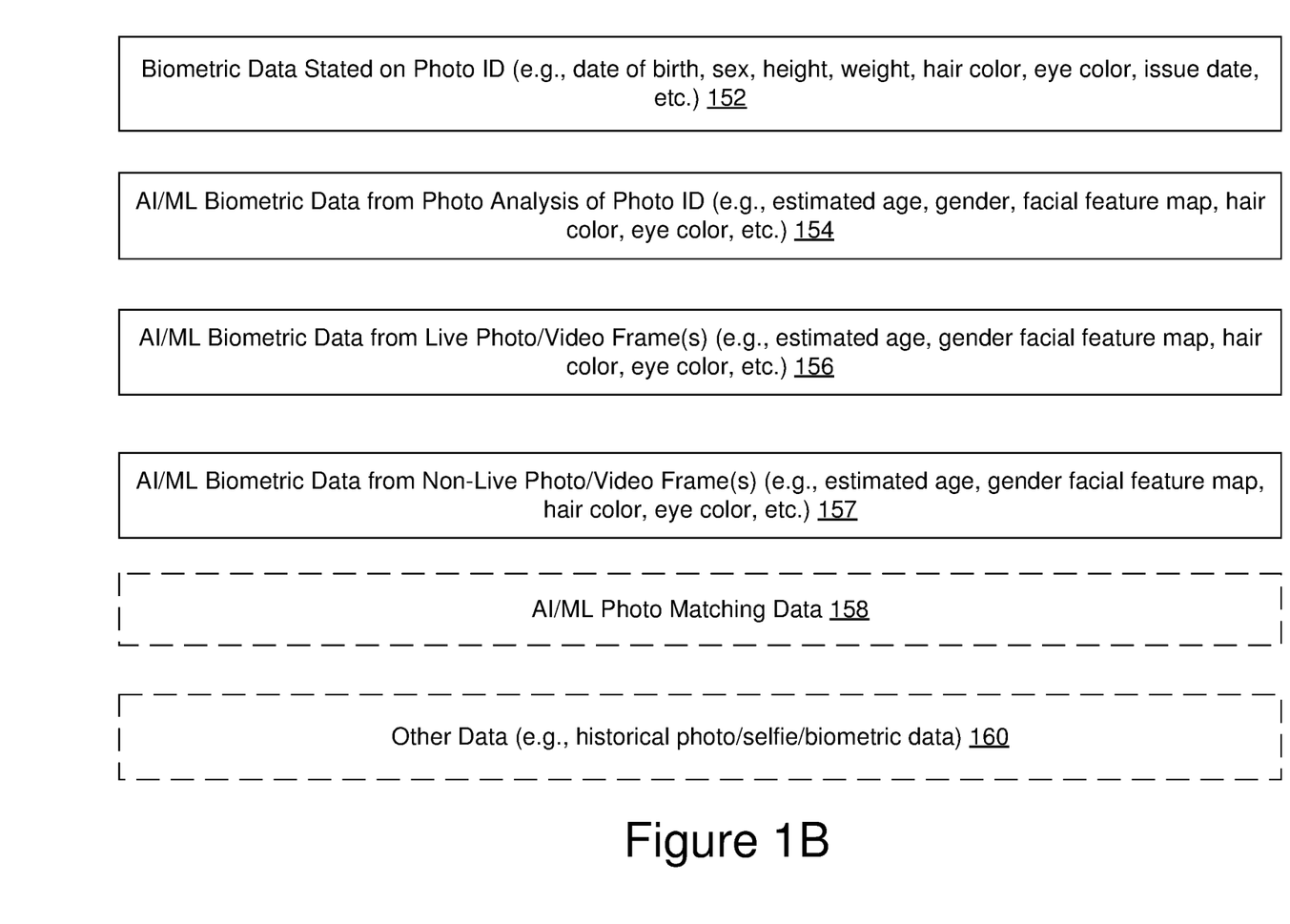
FIG. 1B illustrates examples of data types for fraud detection in the example of FIG. 1A in accordance with some implementations.

FIG. 1B illustrates an example of data signals for fraud detection in accordance with an implementation. There is the biometric data 152 listed on the photo ID that may, for example, be determined from optical character recognition or in some cases by reading an optical bar code or other similar optical code. There is also biometric data that can be identified 154 from the photo on the photo ID using an AI/ML model in view of the quality and resolution of the photo in a photo ID. There is biometric data 156 generated from the live photo(s)/video frames (captured from a client device) using an AI/ML model. There may also optionally be biometric data 157 generated from non-live photo(s)/videos, such as historic selfie photo(s)/videos on file. This information is in addition to any photo matching data 158 regarding identifying a match between a person in a photo ID and a live photo/video. There may also be other data 160 available for fraud detection indicative of potential fraud, such as from an historical database on patterns of fraud, repeat fraudsters, etc.

Figure 2:
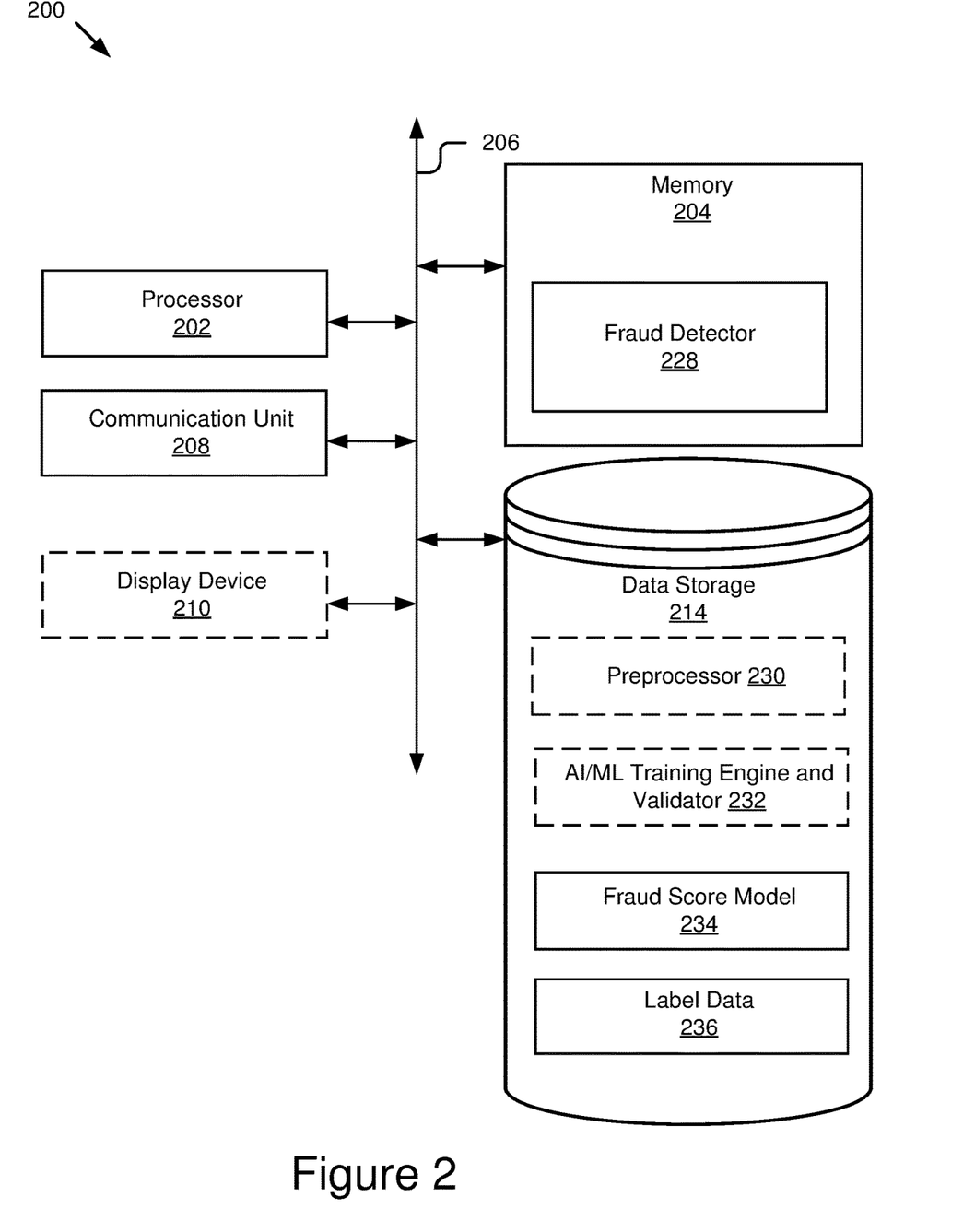
FIG. 2 is an example of a server-based implementation of the system in accordance with an implementation.

FIG. 2 is a block diagram of an example computing device 200 including an instance of the fraud detector 228. The fraud detector and trained AI/ML models may be implemented as computer program instructions stored on memory 204 and executable by processor 202. In the illustrated example, the example computing device 200 includes a processor 202, a memory 204, a communication unit 208, and a display 210.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, and the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the fraud detector 228.

The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

A data storage 214 may store data related to the fraud detector 228. For example, depending on implementation details, it may include a preprocessor 230, an AI/ML training engine and validator 232, a fraud score model 234, and label data 236.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display 210 is a conventional type such as a liquid crystal display (LCD), light emitting diode (LED), touchscreen, or any other similarly equipped display device, screen, or monitor. The display 210 represents any device equipped to display electronic images and data as described herein.

Example Fraud Detector and Fraud Action Engine

Figure 3:
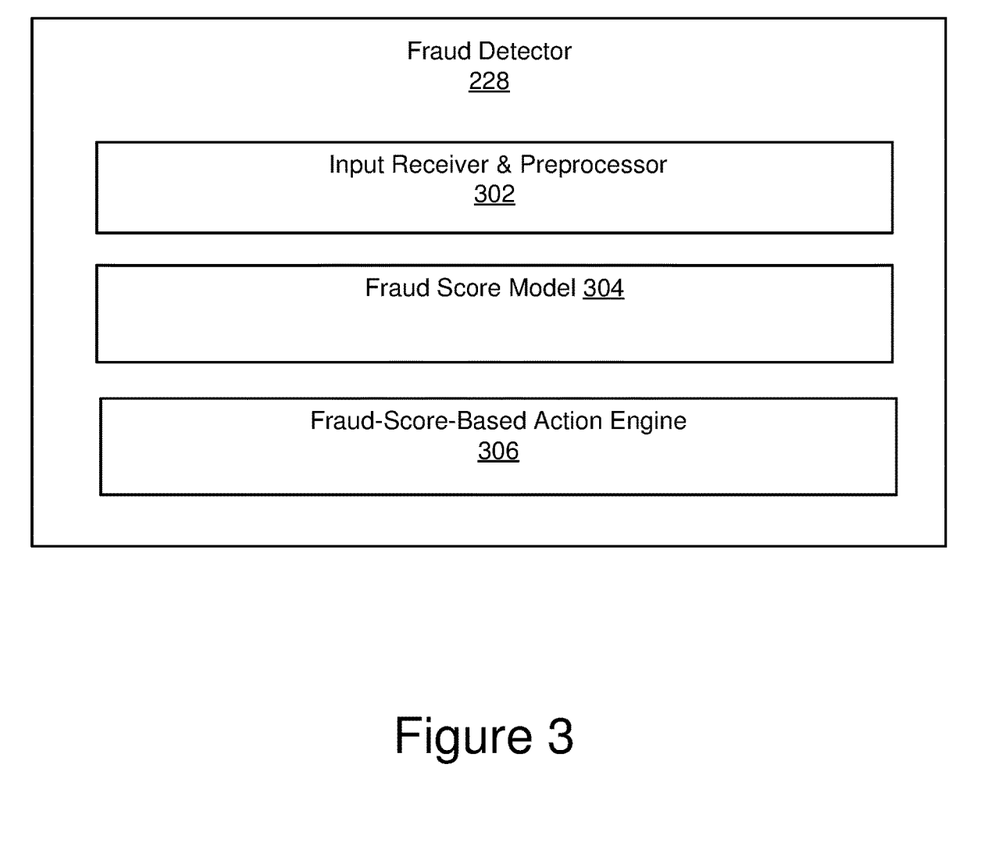
FIG. 3 is a block diagram of an example fraud detector in accordance with some implementations.

Referring now to FIG. 3, a block diagram of an example of a fraud detector 228 is illustrated in accordance with one implementation. In this example AI/ML components are illustrated a high level of abstraction for implementing models for generating and applying an aggregate fraud score. The fraud detector may implement models that may include an input receiver and preprocessor 302 to receive input signals indicative of potential fraud and perform any pre-processing of input signals for feature extraction. One or more trained machine learning models 304 analyze features of biometric data. An action engine 306 determines actions such as generating biometric indictor signals used by the fraud detector or generating alert signals to accept, reject, flag for agent review, etc.

Figure 4:
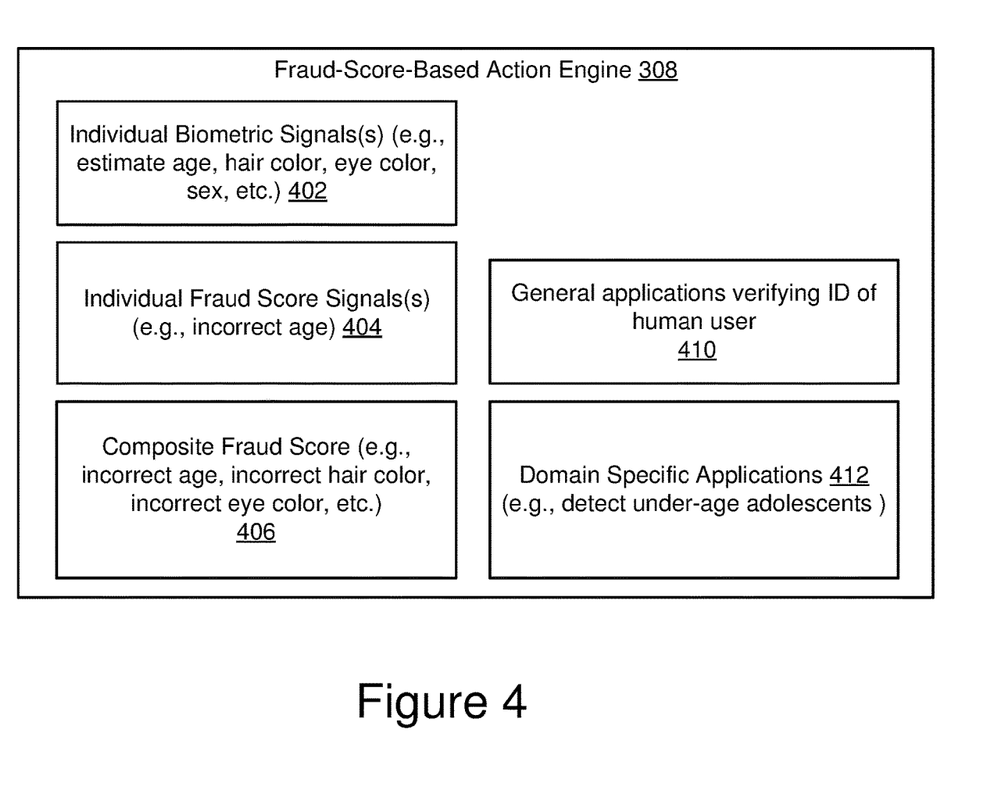
FIG. 4 is a block diagram of an example fraud score-based action engine in accordance with some implementations.

FIG. 4 illustrates an implementation of the fraud score based action engine 308. This may include identifying and outputting individual biometric signals 402 directly or to other components/models. For example, an individual biometric signal 402 could include an estimated age, as one option. Individual fraud score signal 404 could be indication of an incorrect age. For example, an incorrect age could be output as true/false (T/F) signals indicative of a match or mismatch suggestive of fraud. In some cases a composite fraud score 406 may be output. For example, a composite score may weight different signals. For example, hair color is a less reliable indicator of fraud than age because of the possibility user may wear wigs or dye their hair. Eye color is a less reliable indicator of fraud than age because of the possibility a user wears colored contact lenses. However, an identification of fraud may be based on a weighted composite score based, for example, on the combination of age, gender, hair color, eye color, and facial feature filter mask.

It should be noted that a fraud score based action engine 308 may take into account the needs of end-use application. For example, there may be general applications 410 for verifying the ID of a human user. There may also be domain specific applications 412, such as detecting under age adolescents.

Example High-Level Use Cases and AI/ML Implementations

A variety of end-use cases are supported. An example of a use case is analyzing a live photo or a video of a human being, generating an estimated age, and using the estimated age for fraud detection, such as detecting an under-age user.

Another example of an end-use case includes analyzing a photo of a photo ID and generating biometric information from the photo to compare with biometric data listed on the photo ID to identify a fraudulent photo ID. For example, suppose a photo on a photo ID has a listed date of birth and issue date indicating the photo was taken when the subject was 30 years old. An analysis of the photo that indicates an age too young (e.g., less than 20 years old) or too old (e.g., more than 40 years old), may be indicative of a fraudulent photo ID. For example, a fraudster may have use a counterfeit photo ID having their own photo. As one example, suppose a person should be 30 years old at the date of a transaction based on the biometric data listed in their photo ID associated with their birthdate. If the photo-based age estimation is that the person is 50 years old, this may be an indication of attempted identity fraud. As another example, suppose a person should be 30 years old at the date of transaction based on the biometric data listed in their photo ID. If the photo-based age estimation is that the person is 17 years old, this may be an indication of attempted identity fraud.

Some use cases may include generating a composite signal. For example, some types of biometric information generated from a photo, such as age and gender, are strong factors for identifying potential fraud. Other biometric information, such as hair color and eye color, may be weaker factors due to the possibility users dye their hair, wear wigs, or wear colored contact lenses. For example, a composite indicator signal may be generated by weighting signals generated for individual biometric factors (e.g., 75% age, 10% gender, 10% eye color, 5% hair color).

Biometric information may be generated from photos using various techniques. However, one approach is to use a facial model. Facial features may be extracted and used in a machine learning model, such as a neural network model. For example, age may be estimated based on the shape of the face and by skin texture. As people age, skin tends to sag and fine lines and wrinkles develop. In some implementations, fine lines around certain patches of skin highly indicative of aging, such as around the eyes, are analyzed in greater details than other sections of skin on the face. Selectively analyzing patches of the face at a high resolution reduces the computational load to perform the analysis.

Regression models or classifier models are some of the technical options for estimating biometric information generated from photos/video frames. However, in one implementation, a multiclass classifier model is used. For example, for age, the model may have labels for different age ranges. As an example, machine learning model may calculate a confidence factor of an age for a set of ages (e.g., a probability the photo is someone over 20 years old, over 30 years old, over 40 years old, over 50 years old, etc.). In some examples a regression model is further used to define an estimated age (e.g., 29) from the set. There are also other technical options to generate biometric data for age.

The different types of biometric information may be calculated independently of each other. However, they may also be determined in one model. For example, there may be an age label and an auxiliary gender label for gender detection. There are some aspects of the biological aging of skin that is gender-related. As one example, men's skin tends to be thicker than women's skin, and hence men and women's skin tends to age differently. Men and women also tend to have different skin textures. Consequently, in estimating age, gender is also an important factor.

The photoaging of skin may also depend on other factors. Fair skin types on the Fitzpatrick scale tend to experience more photoaging than darker skin types. The, Fitzpatrick scale has six basic skin types used by dermatologists. The Fitzpatrick scale identifies, for example, skin types more likely to burn in the sun and therefore suffer more photoaging skin damage. But more generally, in some implementations, the AI/ML may be based on insights from dermatological models of how human skin ages.

Additionally, there are medical models regarding how aging affects the aging of bones in the face. Some of these age-related changes to facial bones are different for men and women.

There also other medical models regarding common changes to muscle tone in the face with age. There are numerous medical studies about how the face changes with age that can be incorporated into an AI/ML model for face aging, but some of these medical studies show gender differences such that in some implementations it's more efficient to have labels for both age and gender.

There are also medical studies showing that some people age at different rates, at least in terms of visible signs of aging in the face. For example, people who are heavy smokers often have an accelerated aging of their skin. Heavy drinkers also sometimes have accelerated aging of their skin. In some implementations, the photo of a person in a photo ID may be used for calibrating or otherwise adapting to individual differences in aging. For example, if the photo in photo indicates an older visible age in terms of their face (e.g., someone who looks 10 years older than their biological age at age 30) that might be consistent with a selfie photo, taken when the user was at age 35 and having a biological age 10 or more years older than that.

In some implementations, the shape of a face may be determined by having a user input a series of photos from different angles, or a video clip with a user looking in different directions. For example, front and side views may be taken. Moreover, a series of views of a user may be captured (as still photos or as key frames in a video clip) that are sufficient to generate a 3 D model of a face for age estimation and gender estimation.

Eye color and hair color are largely independent of gender. However hair color (for natural undyed hair) is also age dependent, due to the graying of hair with old age. The thinning of hair and the recession of the hairline is also age dependent and some aspects are correlated with gender. For example, male pattern baldness becomes increasingly common after middle age.

A data set may be used to train the neural network machine learning models using supervised learning. For example, the training data set may be a data set that is balanced with a statistically valid number of buckets with an accuracy of each bucket adjusted by a threshold. An accuracy (a confidence value) may be determined.

Example Method Flowcharts

FIGS. 5-8 are flowcharts of example methods that may, in accordance with some implementations, be performed by the systems described above with reference to FIGS. 1-4. The methods are provided for illustrative purposes, and it should be understood that many variations exist and are within the scope of the disclosure herein.

Figure 5:
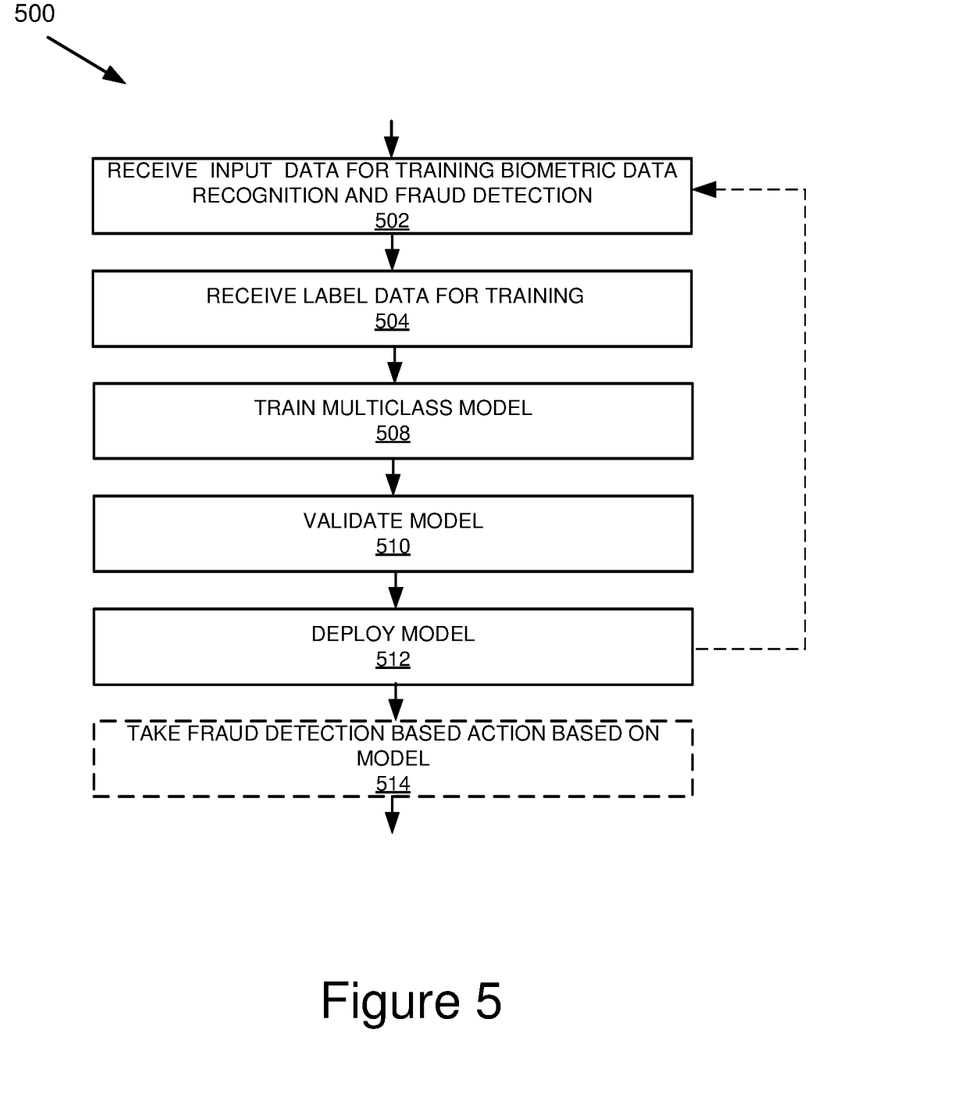
FIG. 5 illustrates a flowchart of a high-level method of training, deploying, and using a machine learning model to identify biometric data and identify fraud in accordance with some implementations.

FIG. 5 is a flowchart of an example method 500 for training an AI/ML model. In block 502 input data is received for training biometric data recognition and fraud detection. For example, the input data set for age recognition may be balanced over different age groups. However, it's also possible in some applications, such as detecting fraud by adolescents, to have more data for younger ages (e.g., below age 30) in the input data set. Label data for AI/ML may be received in block 504. Human labeling may be performed. Alternatively, some labelling may be automatically performed for data acquired during normal use. For example, as the system is used, historical data may be collected of valid user authentication tests, along with photos of the user in such authentications from their photo IDs and selfie photos. Thus, the actual age for selfie photos may be collected along with selfie photos as a source of training data for when the model is re-trained. The labelling may be expanded to other label groups, such as gender. If desired, the labelling may be further expanded to eye color, hair color, and facial filter map. In block 508, a multiclass model is trained. For example, a multiclass model may calculate a probability or a confidence score a user's photo is within a specific age range (e.g., 10 to 20, 20 to 30, 30 to 40, etc.). In some implementations, a single estimated age number is generated for an individual person from the multiclass classification model (e.g., age 22 years old). In block 510 the trained machine learning fraud model is validated using a validation test. In block 512 the trained machine learning fraud model is deployed. In block 514, fraud detection may be performed based on the trained model. As indicated by the dashed arrow, periodic re-training of the model may be implemented.

Figure 6:
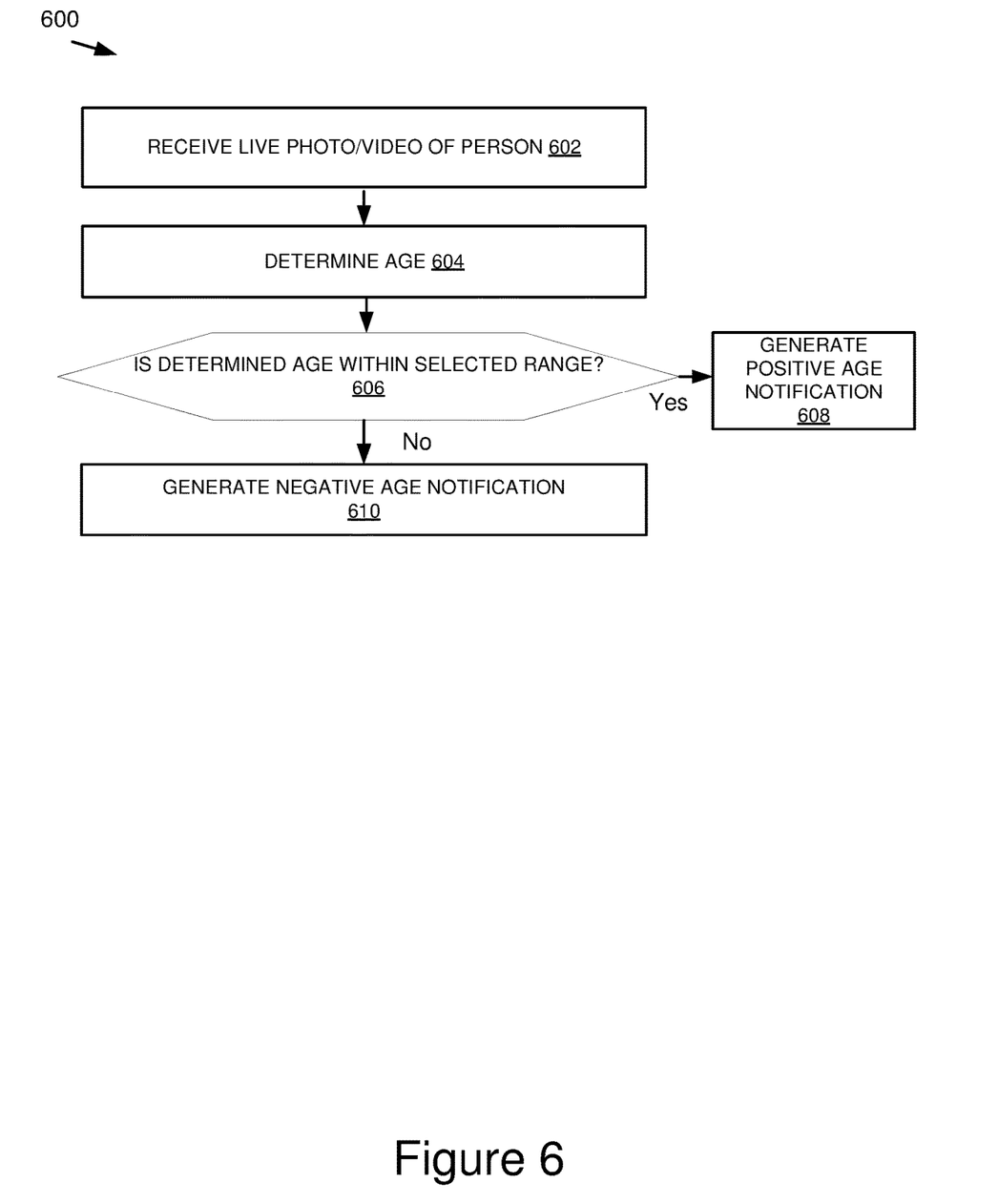
FIG. 6 is a flowchart of an example method for determining age-based fraud in accordance with an implementation.

FIG. 6 illustrates an example of a method 600 for performing age verification based on a live photo or video of a user. In block 602, a live photo, photos, or a video clip of a person is received. In block 604, the age of the person in the photo is determined using the trained AI/ML model. In block 606, a determination is made if the person is within a selected age range. If yes, a positive age notification in block 608. If no, a negative age notification is generated. As an illustrative example, the selected range may correspond to adolescents. For example, a night club may want to identify potential under-age people for a further photo ID test. That is, instead of "carding" everyone they may want to identify a subset of people likely to be under-age, and perform an additional photo ID test. The photo ID test may be performed manually or use any of the previously described methods to verify the ID of the person based on both the live photo(s) or video clip and a photo of their photo ID.

Figure 7:
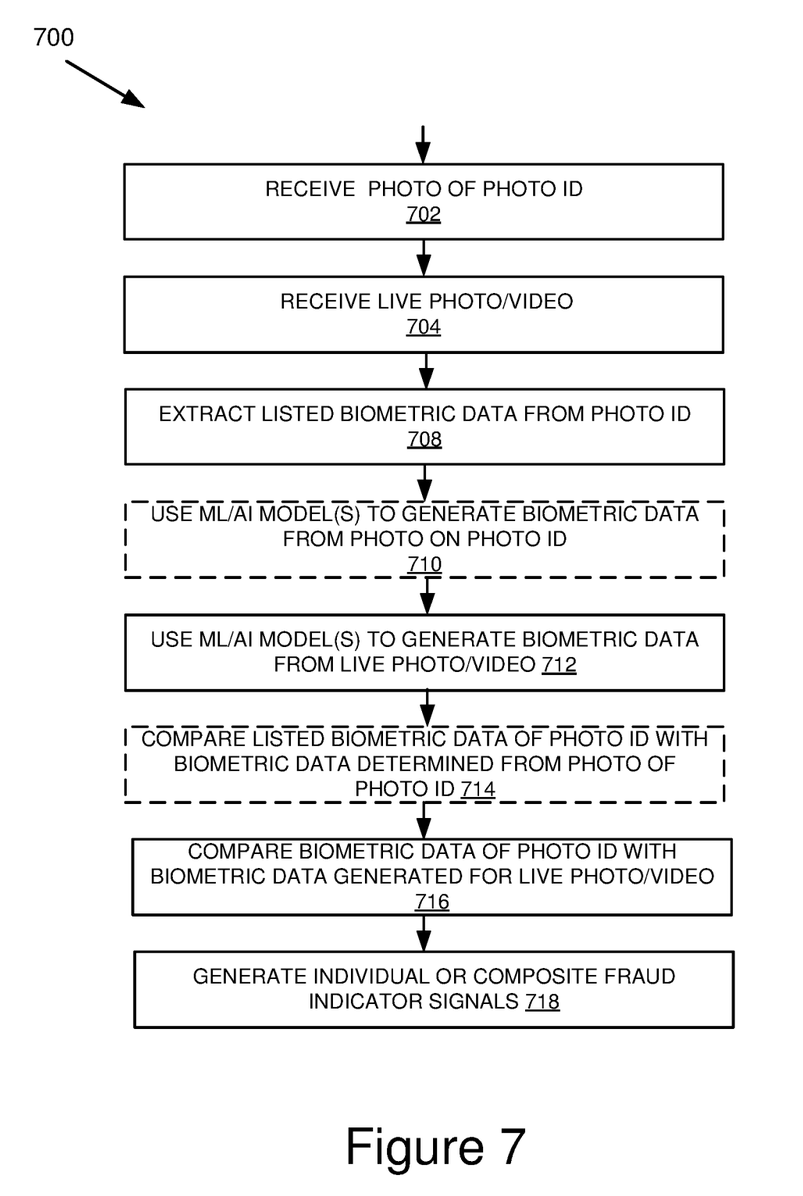
FIG. 7 is a flowchart of an example method identifying identity fraud in accordance with some implementations.

FIG. 7 is a flowchart of an example method 700 in accordance with an implementation. In block 702 a photo (or photos) of a photo ID is received. In block 704, a live photo, photos, or video clip of a user is received. The photo(s) or video are live in the sense they are taken during a verification step that ensures the presence of the person in the photo(s) or video. In block 708 biometric data listed or otherwise optically encoded on a photo ID is extracted from the photo of the photo. For example, passports typically include a data of birth and gender. Many driver's licenses list a date of birth, gender, hair color, and eye color. In block 710, AI/ML models are optionally used to generate biometric data from the photo on a photo ID. In block 712, AI/ML models are used to generate biometric data from live photo (s) or videos. In block 714, an optional step is performed to compare listed biometric data of a photo ID with biometric data determined from the photo of the photo ID. This step may be used to identify potentially fraudulent photo IDs. In block 716, the listed biometric data of the photo ID is compared with biometric data generated for the live photo(s) or video. This step is a way to provide additional information from which to detect fraud. In some implementations, a facial filter is used to generate map of key facial dimension of the photo in the photo ID and the live photo(s) or video are also compared. In block 718, individual or composite fraud indicator signals are generated. These individual or composite fraud indicator signals may be used as an additional source of information in addition to a performing a test to attempt to match the photo in the photo ID and in the selfie.

Figure 8:
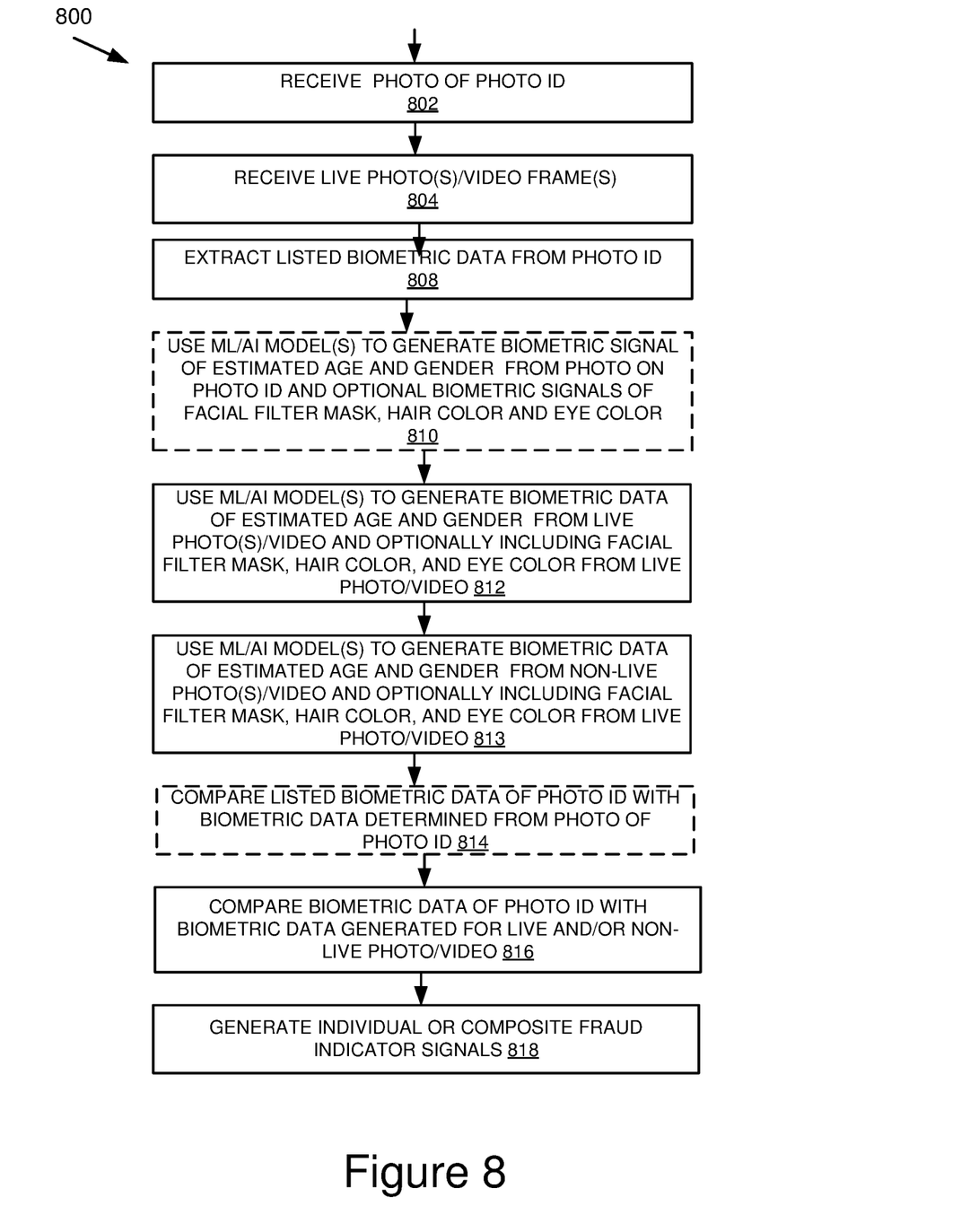
FIG. 8 illustrates an example method for identifying identity fraud in accordance with some implementations.

FIG. 8 is a flowchart of an example method 800 for an example set of biometric data. In block 802, the photo (or photos) of a photo ID are received. In block 804, live photo(s) or video frame(s) are received. In block 808, biometric data listed in the photo ID is extracted, including age and gender. If the ID has additional listed biometric data, this may also be extracted. In block 810, AI/ML models are optionally used to generate a biometric signal of estimated age and gender from a photo on the photo ID. A facial filter may be optionally applied to the photo of the photo ID to optionally acquire a map of key facial dimensions, such as distances related to the eye separation, nose dimensions, mouth dimensions, etc. Optionally, hair color and eye color may also be generated from the photo on the photo ID. In block 812, AI/ML models are used to generate biometric data of estimated age and gender from live photo(s)/video frame(s). Other biometric data may be optionally generated from the live photo(s)/video frames, including a facial filter map of key facial dimensions, hair color, and eye color. In block 813, AI/ML models are optionally used to generate biometric data of estimated age and gender from non-live photo(s)/video frame(s). For example, as previously discussed, there may be previously filed photo(s)/video frames available, such as from a database of historic selfie data. In block 814, an optional step is performed to compare the listed biometric data of a photo ID with biometric data determined from the photo of the photo ID. In block 816, biometric data of the photo ID is compared with biometric data generated from the live photo(s)/video frames and/or any biometric data generate from non-live photo(s)/video frames. In block 818 individual or composite fraud indicator signals are generated.

Other Applications of Biometric Data Signals

It will be understand that the biometric data signals may also be used as an additional input for manual assessment by a human being. For example, the biometric data signals on age, gender, eye color, and hair color could be provided to a human agent as an additional input for the human agent to do an authentication assessment or make authentication decisions, such as consulting with a manager.

NFC Chip Identification Document Applications

Some photo identification documents include a near field chip (NFC) chip that contains all the information in the photo identification document. For example, passports with NFC chips include the passport identification information in a form that can be read by an NFC reader. The NFC chip on government documents (e.g., passports) contain the user's age. In some implementations, the user's age (and/or other biometric data stored on the NFC chip) could be read. This is more secure than using optical character recognition to read the printed biometric data, such as the printed date of birth. For example, the date of birth of a user can be read from an NFC chip. An estimation of an age of the user generated from a selfie image is then compared against the date of birth which is encoded into the NFC chip.

Non-Binary Gender AI/ML Training

Several governments around the world have announced LGBTQ inclusive policies for passports, and in 2021 the United States issued its first patent with an "X" gender. There are government issued passports with M, F, and X genders. In terms of the AI/ML model for photo analysis, the X gender category poses practical challenges in generating enough training data for any AI/ML classification of an X gender to have statistically significant results. However, as more government issued identification documents are issued with an "X" gender, one option would be for an authentication system to generate training data from historical data associated with authentic "X" gender photo identification documents and selfie photos. Other sources of training data for the "X" gender could also be acquired or generated. Care needs to be taken in the AI/ML model training to prevent bias against LGBTQ people. However, as more photo identification documents are issued with an X gender in the coming years, the training of the AI/ML can be updated to attempt to obtain statistically significant results for identifying an "X" gender from a selfie.

LGBTQ inclusive policies may eventually result in government issued photo identification documents with additional categories besides M, F, and X. However, should this occur, the AI/ML model design and training could be further refined to include additional non-binary gender categories corresponding to the categories in government issued photo identification documents.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method for user authentication comprising:
   receiving a photo of a photo identification document of a human being to be authenticated;
   receiving at least one additional photo of the human being to be authenticated taken live during a verification test;
   identifying first biometric data listed in the photo identification document, including listed age data;
   generating second biometric data based on the photo of the photo identification document utilizing a machine learning model trained to identify biometric age data from photos, the second biometric data including a first estimated age and an aging rate with respect to the listed age data of the photo identification document;
   generating third biometric data based on the at least one additional photo by analyzing the at least one additional photo utilizing the machine learning model trained to identify biometric data from photos including generating a second estimated age;
   calibrating the second estimated age based on the aging rate; and
   generating a fraud signal based on a comparison of the first biometric data listed in the photo identification document and the generated second and third biometric data.

2. The computer-implemented method of claim 1, wherein generating the third biometric data based on the at least one additional photo comprises generating at least one of an age and a gender based on the at least one additional photo.

3. The computer-implemented method of claim 2, wherein generating the fraud signal comprises comparing a least one of an age and a gender between the first biometric data of the photo identification document, the second biometric data, and the third biometric data generated based on the at least one additional photo.

4. The computer-implemented method of claim 2, wherein the biometric data listed in the photo identification document further comprises an eye color and a hair color.

5. The computer-implemented method of claim 4, wherein generating the fraud signal comprises comparing an age, a gender, an eye color, and a hair color between the biometric data of the photo identification document and the biometric data generated based on the at least one additional photo.

6. The computer-implemented method of claim 1, further comprising implementing a facial filter to identify a facial feature map of facial features in the photo in the photo identification document and in the at least one additional photo, and generating the fraud signal further comprises comparing the facial feature map of the photo in the photo identification document and in the at least one additional photo.

7. The computer-implemented method of claim 1, wherein
   generating the fraud signal includes comparing the identified first biometric data listed in the photo identification document with second biometric data generated based on the photo of the photo identification document.

8. The computer-implemented method of claim 1, wherein generating the first and second estimated age is based at least in part on a model of facial skin aging, facial bone aging, and facial muscle aging.

9. The computer-implemented method of claim 1, wherein generating the third biometric data from the at least one live photo comprises analyzing, at a higher level of resolution, selected patches of a face indicative of aging to reduce a computational load.

10. A computer implemented system, comprising:

a machine learning fraud model trained to analyze biometric data in photos from: 1) a photo of a photo identification document submitted by a user and 2) a set of photos or a video of a face of the user taken at different angles sufficient to generate a three-dimensional model of a face for age estimation and gender estimation, during a verification step;

the machine learning fraud model generating a fraud indicator signal for a fraud detector based at least in part on a comparison of biometric data listed in the photo identification document and biometric data identified by the machine learning fraud model from the set of photos or video of the user taken during the verification step;

wherein the biometric data listed in the photo identification document includes a listed eye color, a listed hair color and the biometric data identified in the photo or video includes an age, a gender, an eye color, and a hair color;

wherein the biometric data generated by the machine learning fraud model includes an age, a gender, an eye color, and a hair color; and wherein the system compares the biometric data listed in the photo identification document with biometric data generated based on the photo of the photo identification document and determines if there is a mismatch indicative of a fraudulent photo identification document.

* * * * *